July 22, 1952  C. A. WIKEN ET AL  2,604,126
BAND SAW WHEEL ADJUSTING MEANS
Filed Dec. 1, 1947  8 Sheets-Sheet 4

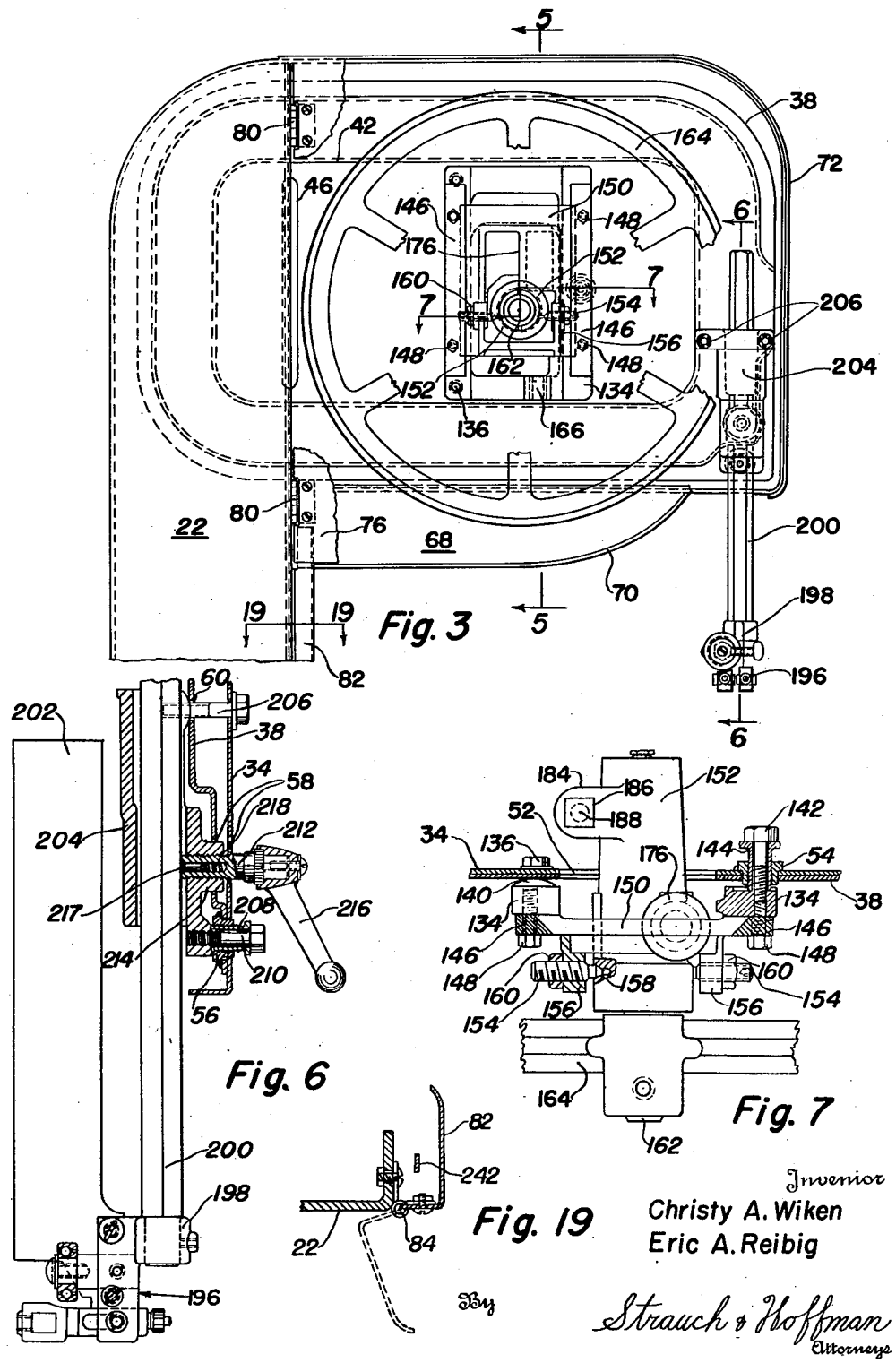

INVENTOR.
Christy A. Wiken
BY Eric A. Reibig
Strauch & Hoffman
Attorneys

July 22, 1952

C. A. WIKEN ET AL 2,604,126

BAND SAW WHEEL ADJUSTING MEANS

Filed Dec. 1, 1947

INVENTOR.
Christy A. Wiken
BY Eric A. Reibig

Strauch & Hoffman
Attorneys

July 22, 1952  C. A. WIKEN ET AL  2,604,126
BAND SAW WHEEL ADJUSTING MEANS
Filed Dec. 1, 1947  8 Sheets-Sheet 6

Inventor
Christy A. Wiken
Eric A. Reibig
By Strauch & Hoffman
Attorneys

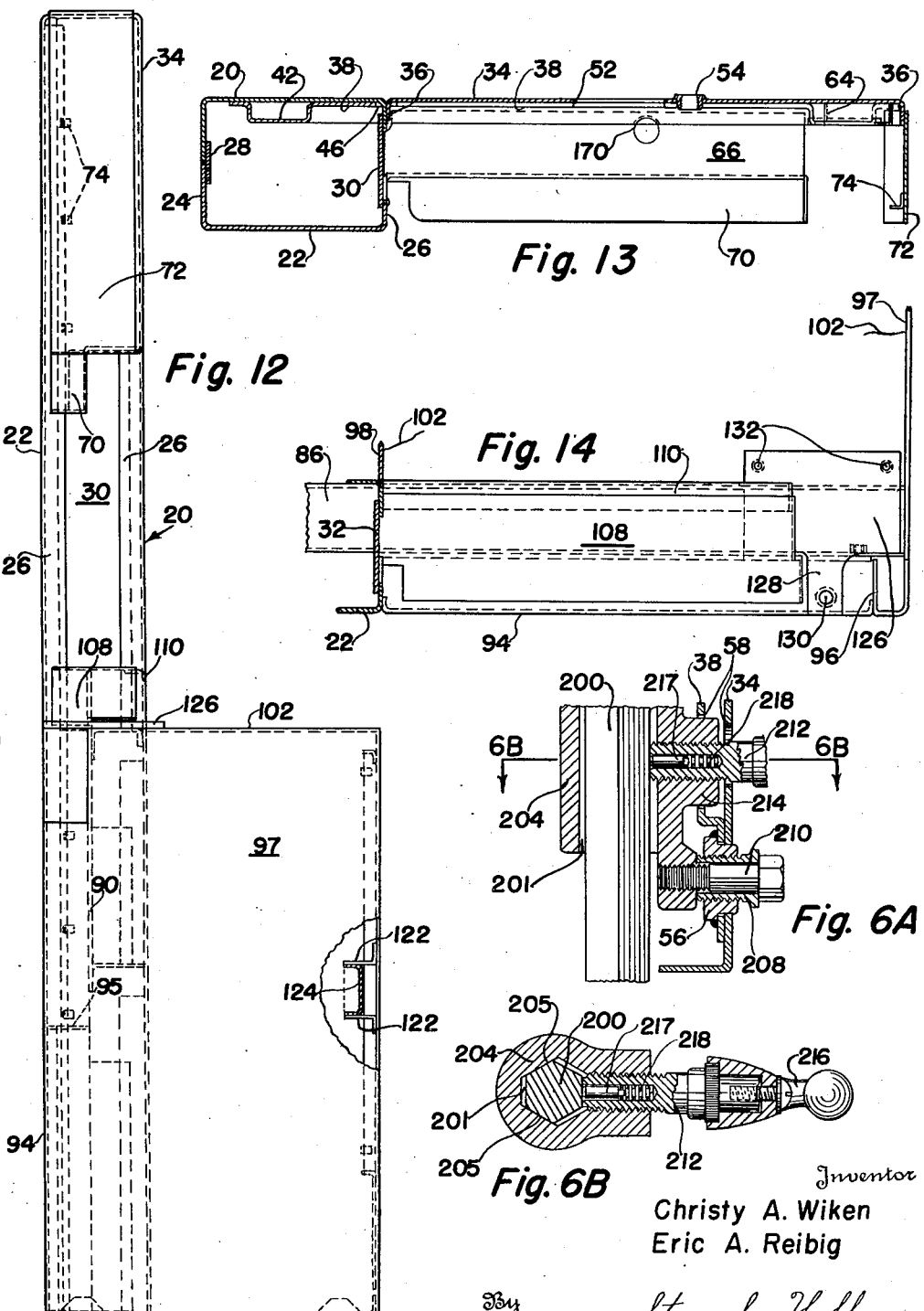

July 22, 1952  C. A. WIKEN ET AL  2,604,126
BAND SAW WHEEL ADJUSTING MEANS
Filed Dec. 1, 1947  8 Sheets-Sheet 8
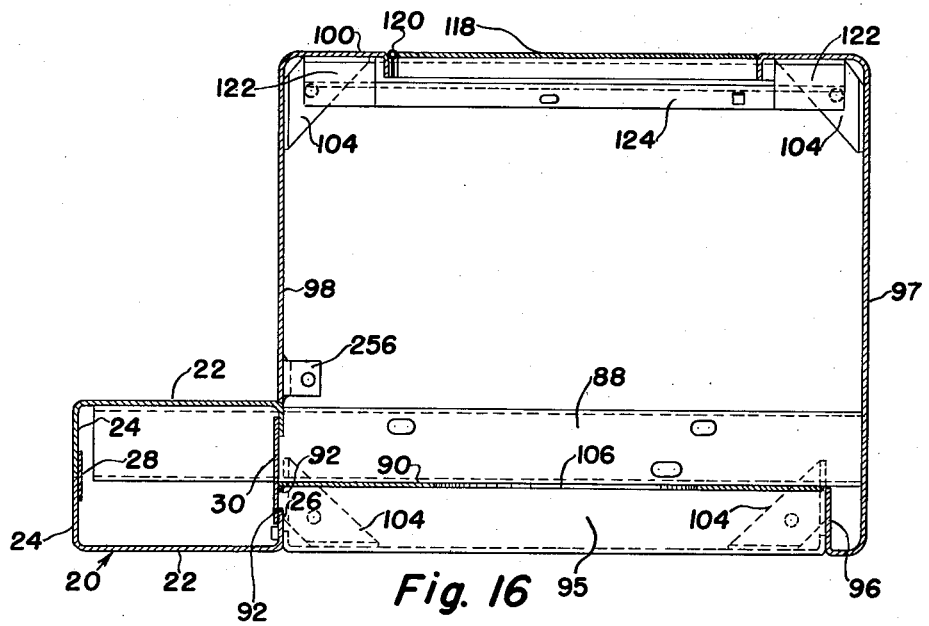
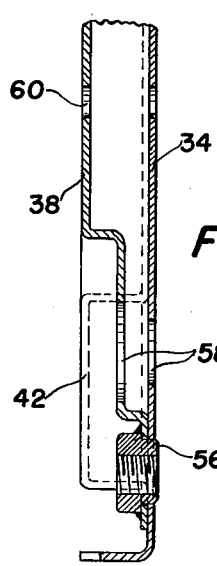
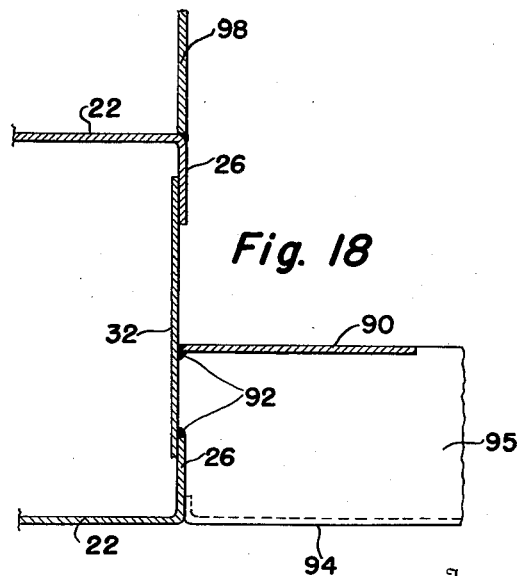
Inventor
Christy A. Wiken
Eric A. Reibig
By Strauch & Hoffman
Attorneys Patented July 22, 1952

2,604,126

UNITED STATES PATENT OFFICE 2,604,126

BAND SAW WHEEL ADJUSTING MEANS

Christy A. Wiken, Pittsburgh, Pa., and Eric A. Reibig, Milwaukee, Wis., assignors to Rockwell Manufacturing Company, Pittsburgh, Pa., a corporation of Pennsylvania Application December 1, 1947, Serial No. 789,002

4 Claims. (Cl. 143—31)

This invention relates to band saws and has for its general object and purpose to provide a light weight machine of this kind of novel design and construction that may be easily kept in accurately operating neat condition.

One of the important objects of the invention resides in the provision of a novel welded sheet steel cabinet structure having a hollow vertical column and upper and lower compartment assemblies for the operating parts of the machine rigidly welded to said column and extending laterally from one side thereof.

A more particular object of the invention resides in the provision of a reinforcing unit internally welded to the rear wall of the upper compartment assembly of the cabinet structure and extending into the hollow vertical column and welded to one of the column walls.

It is an additional object of the invention to provide a cabinet structure for band saws as above characterized, in which each of the compartment assemblies is provided with a hinged front door, the door for the upper compartment assembly having a vertical guard extension substantially enclosing the part of the saw blade adjacent to the vertical column in the closed position of said door to protect the operator against possible injury.

A further important object of the invention is to provide a novel three point mounting of the saw band wheels in the upper and lower compartments of the housing and also for the work table so that such parts can be easily and quickly adjusted to accurately align the wheels and insure free movement of the saw blade through the work table, notwithstanding possible relative misplacement of parts of the cabinet structure due to distorting stresses or other injuries in the shipment of the machine or in the installation of new parts. Thus the useful life of the machine will be extended and maintenance expense reduced to a minimum.

For the same reason, it is an additional object of the invention to provide a novel three point mounting of an upper vertically adjustable blade guiding and guard assembly in the upper wheel compartment of the cabinet.

Another object of the invention resides in the provision of a novel adjustable mounting of the upper wheel shaft with separate means for vertically adjusting the same to tension the band saw and for angularly adjusting the wheel shaft to insure proper and accurate tracking of the saw blade upon the peripheries of the upper and lower wheels.

In a preferred embodiment of the invention, a novel construction and mounting of a dust spout upon the lower compartment assembly of the cabinet is provided which can be readily connected with a source of suction to continuously remove saw dust in the operation of the machine from the vicinity of the work table and the operator.

With the above and other objects in view, the invention comprises the improved band saw, and the construction and relative arrangement of the several parts, as will hereinafter be more fully described, illustrated in the accompanying drawings and subsequently incorporated in the subjoined claims.

In the drawings wherein we have disclosed one simple and practical embodiment of the present invention, and in which similar reference characters designate corresponding parts throughout the several views:

Figure 3 is a similar view showing the upper wheel mounting for the saw blade.

Figure 6 (Sheet 3) is a similar sectional view taken on line 6—6 of Figure 3.

Figure 6A (Sheet 7) is a fragmentary vertical section on an enlarged scale of certain parts of the upper blade guide mounting.

Figure 6B is a horizontal section taken substantially on the line 6B—6B of Figure 6A.

Figure 7 (Sheet 3) is a horizontal sectional view taken on the line 7—7 of Figure 3.

Figure 12 is a side elevation thereof.

Figure 13 is a horizontal sectional view taken on the line 13—13 of Figure 11.

Figure 14 is a similar sectional view taken on the line 14—14 of Figure 11.

Figure 16 (sheet 3) is a horizontal section taken on the line 16—16 of Figure 11.

Figure 17 is a detail vertical section taken on the line 17—17 of Figure 11.

Figure 11:
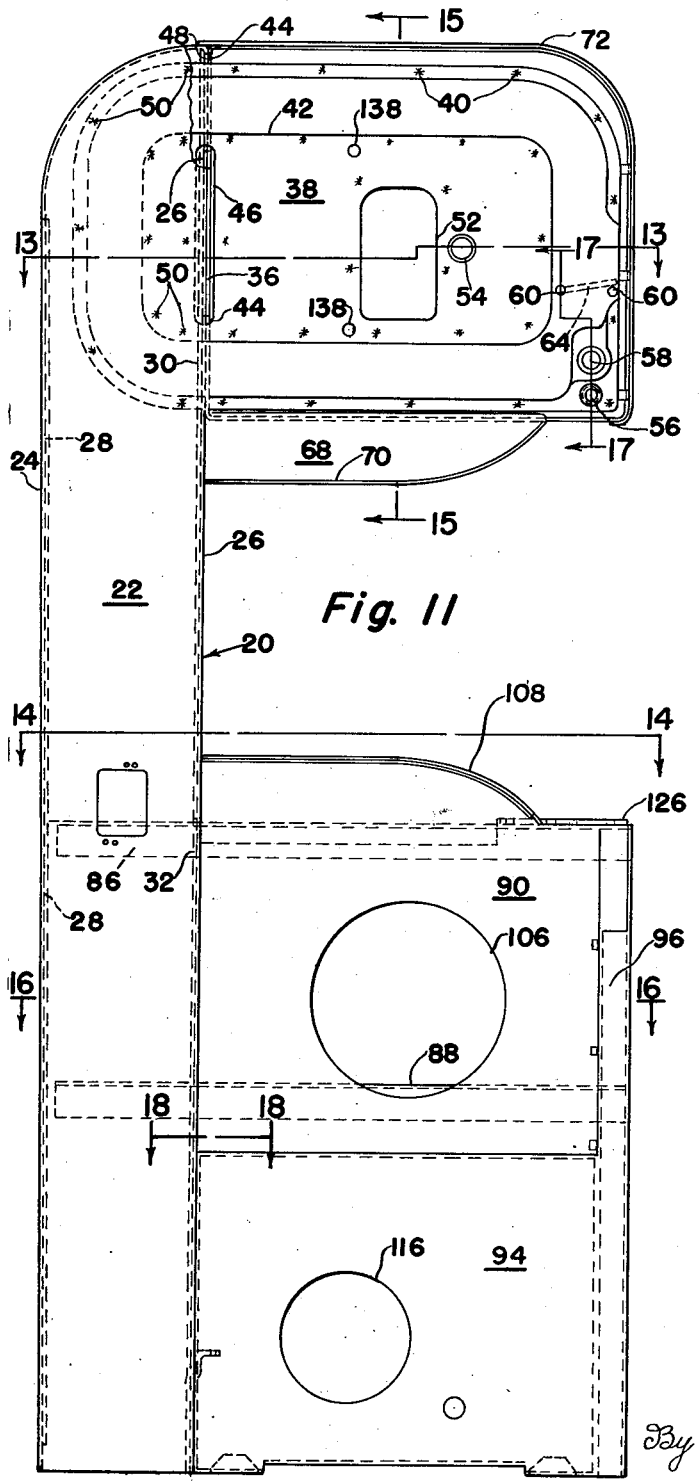
Figure 11 is a front elevation of the cabinet frame structure the doors being omitted.
Figure 15:
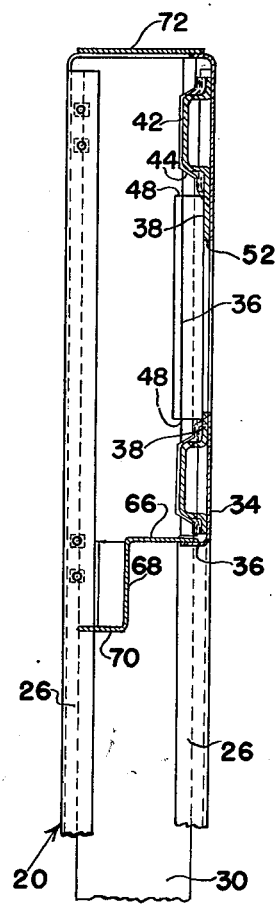
Figure 15 (sheet 6) is a vertical sectional view taken on the line 15—15 of Figure 11.

Figure 18 is a detail horizontal sectional view taken on the line 18—18 of Figure 11, and Figure 19 (sheet 3) is a detail horizontal sectional view taken on the line 19—19 of Figure 3.

Referring for the present to Figures 1 and 11 to 19 of the drawings, the improved welded machine frame or cabinet structure includes a vertical column 20 at the left hand side of the operator's position. Preferably, this column comprises two rolled sheet metal sections 22 of channel shaped form in cross section having relatively wide outer side flanges 24 and narrow inner side flanges 26. The vertical edges of the flanges 24 are held in close abutting contact with each other by means of the vertically extending plate 28 bridging said adjoining edges of the flanges 24 and securely welded to the inner sides thereof. The flanges 26 are similarly connected and rigidly held in spaced apart relation by the relatively wide upper and lower splice plates 30 and 32 respectively securely welded along their vertical edges to the inner faces of said flanges.

An upper wheel compartment assembly extends laterally from the upper end of the column 20 and comprises a rear sheet metal body wall 34 having an angularly disposed forwardly projecting flange 36 extending along each edge of said wall.

The wall 34 is reinforced and rigidly connected to the column 20 by means of the sheet metal plate 38 securely welded at a plurality of points 40 to the inner face of the wall 34. This plate covers the major portion of the surface of wall 34 and is die pressed to provide a continuous reinforcing rib 42 of a suitable width adjacent to and parallel with the outer edge of said plate. It will be noted that the reinforcing plate 38 is of greater length than the wall 34 and projects beyond one end thereof. The flange 36 on this end of the wall 34 is cut away or recessed at vertically spaced points as at 44 to accommodate the section of the plate 38 provided with the rib 42. Between these recesses 44, the flange 36 projects forwardly through a vertically extending slot 46 in the plate 38, which also receives the flange 26 on the rear section 22 of the column 20 between the vertically spaced recesses 48 in said flange mating with the recessed 44 in the flange 36. The flanges 36 and 26 are securely welded together while the adjacent end portion of the plate 38 extends into the column 20 and in contact with the surface of the rear wall of said column to which said end of the reinforcing plate is securely welded at a plurality of spaced points, as indicated at 50.

The compartment wall 34 and reinforcing plate 38 are provided with vertically elongated rectangular openings as indicated at 52 to accommodate parts of the upper wheel mounting as will be readily understood from the following description.

Adjacent to one side of these openings registering circular openings are formed in the wall 34 and plate 38 to receive an internally threaded cylindrical bushing 54 securely welded at its outer flanged end to the body wall 34. A similar internally threaded bushing 56 is inserted through registered openings in wall 34 and plate 38 at the lower right hand end thereof and the inner flanged end of this bushing is securely welded to the plate 38. Above this bushing registering openings 58 are also provided in the plate 38 and wall 34 and above the latter openings the horizontally spaced small diameter openings 60 are provided. These several openings and the bushing 56 receive parts of the mounting and adjusting means for the upper saw blade guide unit as will be presently described. Preferably, at this end of the plate 38 the rib 42 is formed with a wide section extending to the end edge of the plate and between the wall of said rib and the rear body plate 34, a horizontally inclined reinforcing member 64 extends between the spaced openings 60 and is securely welded to said wall and the plate 38.

A wheel guard member, also stamped from sheet metal, is of general Z-shaped form in cross section and has an upper horizontal portion 66 welded to the lower flange 36 on the wall 34 and extending forwardly therefrom, a vertical depending portion 68 and a lower horizontal portion 70. This guard member terminates in spaced relation from the right hand vertical edge of the compartment assembly and at this end of the guard member the lower flange portion 70 thereof is upwardly curved in more or less concentric relation with the wheel mounted within the compartment.

To the flange 36 at the top and right hand end of the wall 34, externally thereof one edge of a metal door guard strip 72 is securely welded and projects forwardly thereof, as seen in Figure 13. Suitable stop lugs 74 are welded to the inner face of the vertical end portion of the strip with which a marginal flange 78 on the compartment door 76 is adapted to abut when the door is closed. This door is hingedly mounted upon the vertical column 20 by suitably spaced hinges 80. A vertical guard member 82 of substantially U-shaped form in cross section is welded to the inner face of the door at its hinged edge and extends downwardly therefrom, providing a channel through which the saw blade moves upwardly to the upper drive wheel. This guard member at its lower end is also hinged to the column 20, as indicated at 84.

The lower wheel and motor compartment assembly extends rearwardly as well as laterally from the vertical column 20. This assembly includes the vertically spaced horizontal members 86 and 88 of inverted U-shaped form in cross section. These members at one of their ends extend through suitable recesses provided in the flange 26 of the rear column section 22 and one side flange of each of said members is securely welded to the rear wall of said column section. To the other side flanges of the members 86 and 88 a vertically disposed wall 90 is suitably welded and extends below the member 88. As shown in Figure 18, the vertical side edge of the wall 90 and the edge of the flange 26 on the front column section 22 are welded to plate 32 as indicated at 92, thus effectively closing the compartment space behind the wall 90.

A second vertical wall section 94 is disposed substantially flush with the front side of column 20 and at its upper end has a horizontal flange or shelf portion 95 extending inwardly to the lower edge of the wall section 90. At each of its vertical side edges wall section 94 is suitably flanged and securely welded to the adjacent flange 26 of the column 20 and to the inwardly turned front vertical edge portion 96 of the right hand side wall 97 of the compartment assembly.

This wall and the opposite side wall 98 may be integrally formed with a rear end wall 100 to the upper edges of which the top wall 102 is suitably welded. The front vertical edge of wall 98 is also welded to the rear section of column 20. The compartment walls 94, 97, 98, and 100 at their lower ends are welded to corner foundation plates 104 of suitable form, which if desired may be anchored to the floor. The vertical wall section 90 is provided with a large diameter opening 106 to accommodate parts of the mounting for the lower wheel which rotates in a vertical plane in alignment with the horizontal flange or shelf portion 95 of the lower wall section 94. A wheel guard member 108 is welded along its longitudinal rear edge to a flange on the upper edge of a vertical rear wall 110, the lower edge of which is suitably welded to the U member 86. This guard member extends forwardly over the upper edge of the wall section 90 and at the right hand end thereof said guard member is downwardly curved in more or less concentric relation with the lower wheel.

A second door 112 hinged to the column 20, as at 114, normally closes the space in which the wheel rotates, between the guard member 108 and the upper end of the wall section 94. This wall section 94 is also provided with an opening 116 which accommodates the forward end of the shaft of the motor mounted behind the wall section 94, as will later be explained.

The rear wall 100 of the lower compartment assembly is provided with a vertically extending opening also normally closed by a door 118 hingedly mounted along one vertical edge on said wall as at 120. (See Figure 16.) At each side of this door opening and substantially midway between its upper and lower ends, a pair of vertically spaced bracket members 122 are welded or otherwise secured to the inner side of the rear compartment wall 100. Between the inwardly extending portions of these bracket members the opposite ends of a channel bar 124 are positioned with the open side of the channel facing inwardly. The upper and lower flanges of this bar are securely welded to the bracket members as clearly seen in Figure 12.

To the upper surface of the channel bar 86 at its right hand end and beyond the wheel guard member 108 a horizontally disposed mounting plate 126 is securely welded. As seen in Figure 14, this plate is provided with a central forwardly projecting end portion 128 of reduced width having a large diameter threaded opening 130 therein. At its rear end this plate is provided with widely spaced small diameter threaded openings 132. Upon this plate, the supporting bracket member for the work table is mounted for adjustment relative to the machine frame, as will presently be described.

Figure 5:
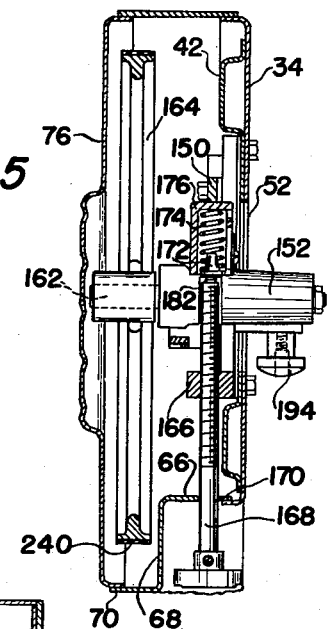
Figure 5 is a vertical sectional view taken on the line 5—5 of Figure 3.

The upper band saw wheel is adjustably mounted in the upper compartment assembly of the cabinet structure as best shown in Figures 3, 5 and 7 of the drawings. A vertically disposed rectangular frame member 134 is arranged with the frame opening registering with the opening 52 in the rear compartment wall and is supported at one side of said opening by means of screws 136 loosely disposed through openings 138 (see Figure 11) in the wall 34 and reinforcement plate 38 and threaded in the upper and lower ends of said frame member. At these points, the frame member is provided with convex faces 140 having rocking contact upon the reinforcement plate 38. At the opposite side of said frame and substantially midway between its upper and lower ends, a third point of support is provided by the screw 142 rotatably disposed through an adjustable sleeve 144 threaded in the bushing 54, said screw at its inner end being threaded in the frame member 134. It will therefore be obvious that by loosening the screw 142 and adjusting the sleeve 144 in bushing 54, after loosening the screws 136, the frame 134 can be angularly adjusted relative to the plane of the rear compartment wall 34.

At opposite sides of the frame opening, vertically extending guide rails 146 are secured to frame 134 by screws 148. These rails have inner beveled edges to guidingly coact with correspondingly beveled edges of a vertically movable shaft bearing carriage 150. In this carriage, the pulley bearing sleeve 152 is rockably mounted between the pivot pins 154, threaded in bosses 156 formed on the carriage 150 on opposite sides thereof. These pivot pins have conical inner ends engaged in seats 158 formed on opposite sides of the bearing sleeve 152 and are locked in their adjusted position by the nuts 160. The sleeve 152 extends rearwardly of the compartment wall 34 through the opening 52 and within said sleeve grease packed bearings of suitable type are mounted, in which the shaft 162 of the upper band saw wheel 164 is journalled.

Figures 8, 9, 10:
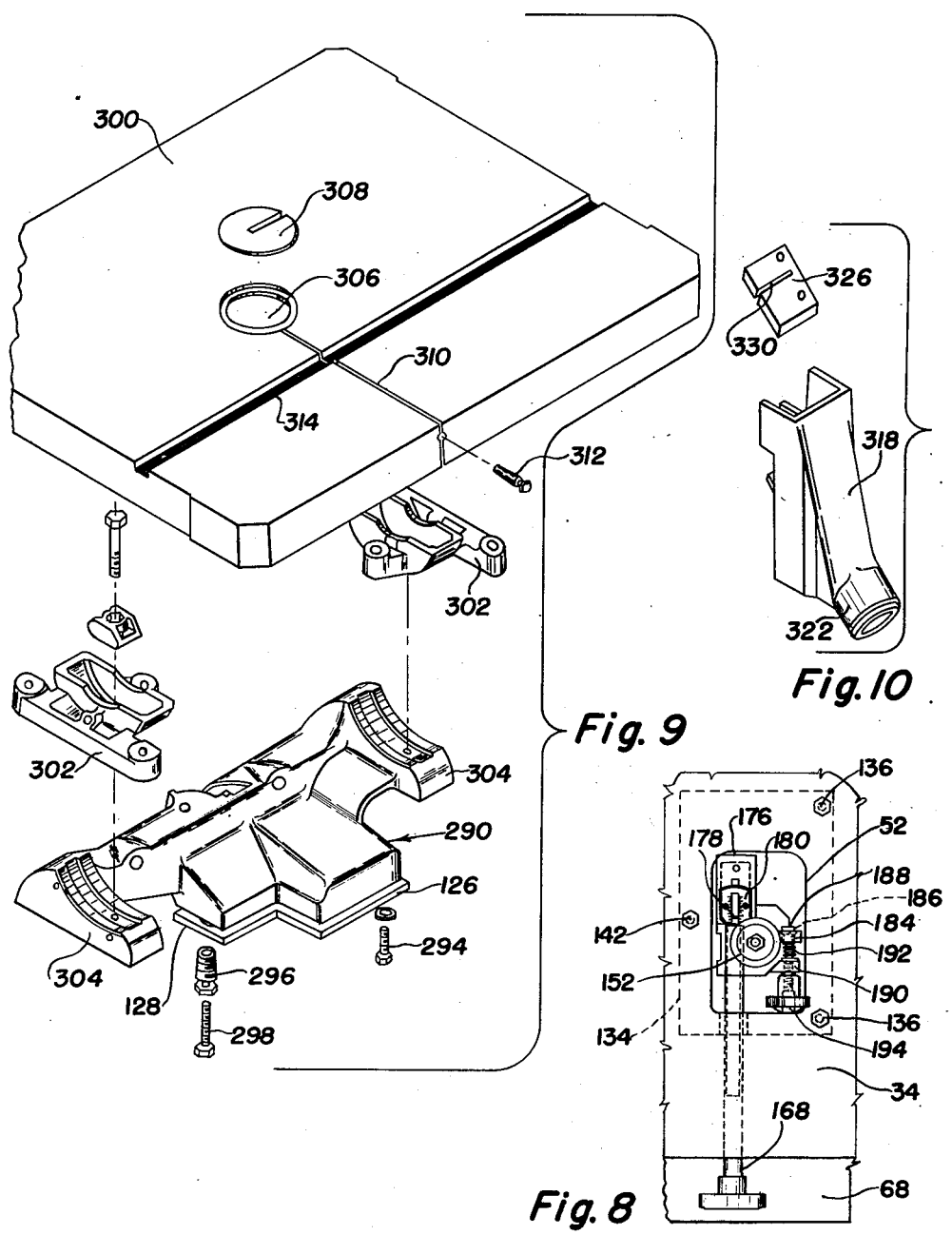
Figure 8 (Sheet 5) is a rear elevation showing the adjusting means for the upper wheel shaft bearing.
Figure 9 is a disassembled perspective view of the principal parts of the work table mounting.
Figure 10 is a similar view of the dust spout attachment.

The frame 134 at its lower end is provided with an internally threaded boss 166 for an adjustable tension regulating screw 168 extending upwardly through an opening 170 in the upper horizontal portion 66 of the wheel guard member. The upper end of this screw 168 carries a seating cap 172 for the lower end of a tensioning spring 174 contained within a housing part 176 formed on the carriage 150. A suitable pointer 178 is interposed between the cap 172 and the lower end of the spring 174 and coacts with a graduated scale 180 suitably secured to the rear side of the carriage 150, as seen in Figure 8 of the drawing. Rearwardly of the pivot pins 154, the side wall of the bearing sleeve 152 is recessed or cut away as indicated at 182 in Figure 5 of the drawings to accommodate the adjusting screw 168.

Bearing sleeve 153 at the opposite side thereof and rearwardly of the compartment wall 34 is provided with a laterally projecting lug 184 (Figure 8) having a vertical opening therethrough and a rectangular recess 186 in its upper face to receive the rectangular head of a bolt 188 which extends downwardly through said lug and through a similar apertured lug 190 formed upon the rear side of the carriage 150. Between these spaced lugs a coiled spring 192 surrounds the bolt 188, and the lower end of said bolt is threaded to receive the hand knob 194 having bearing contact with the lug 190. It will thus be apparent that by the adjustment of this hand knob, the bearing sleeve 152 and the pulley shaft mounted therein may be vertically rocked between the pivot pins 154 to position the pulley in a predetermined plane of rotation relative to the compartment wall 34.

The upper saw blade guide unit assembly indicated at 196 is carried by a bracket 198 (Figure 3) fixed to the lower end of a rod 200 of polygonal form in section. The lower end of a saw blade guard member 202 (Figures 6, 6A and 6B) in parallel relation to the rod 200 is also fixed to the bracket 196. The rod 200 is vertically adjustable in a supporting bracket 204 having a three point mounting within the upper pulley compartment. Thus at its upper end, the bracket 204 is held in rocking contact with reinforcement plate 38 by means of the screws 206 extending through openings 60 in said plate and the wall 34 and threaded into the supporting bracket 204. At its lower end the bracket 204 is engaged by the adjustable sleeve 208 threaded in the bushing 56. A bolt 210 extending through the sleeve 208 and threaded in the bracket 204 secures the latter in adjusted position. It will thus be clear that by loosening the bolts 206 and 210 and turning the sleeve 208 in bushing 56, the position of the supporting bracket 204 relative to the compartment wall 34 may be properly adjusted to dispose the blade guiding unit 196 and the guard member 202 in parallel relation to the blade and obviate binding frictional resistance to the free movement of the saw blade, in the event of possible distortion of wall 34.

The rod 200 is held in its vertically adjusted position relative to bracket 204 by means of the member 212 threaded in a boss 214 on the supporting bracket 204 and extending outwardly through openings 58 in wall 34 and the adjacent portion of plate 38. A suitable handle 216 is connected to the outer end of member 212, whereby it may be conveniently rotated into or out of tight binding contact with one side face of the rod 200. The inner end of member 212 is bored to receive a pin 217 yieldingly urged by spring 218 against the rod 200 to yieldingly restrain said rod against gravity downward movement relative to member 204 when the holding pressure of member 212 against said rod is released. The upper saw blade guide unit assembly 196 is not claimed herein since it is substantially the same as that disclosed in the Tautz Patent 2,032,233 of February 25, 1936.

From reference to Figures 6A and 6B it will be noted that the guide opening 201 in bracket 204 is of different cross sectional dimensions from the rod 200 and has relatively wide opposed reversely inclined surfaces 205 remote from the member 212. Thus, in the adjustment of said member the rod 200 is forced laterally in the bracket to frictionally engage opposite side faces thereof with the surfaces 205 of the bracket opening, the remaining faces on the rod being spaced from opposed surfaces of said opening. In this manner with the use of only a single adjusting member 212 the rod 200 may be accurately positioned in parallelism with the saw blade.

Figure 1:
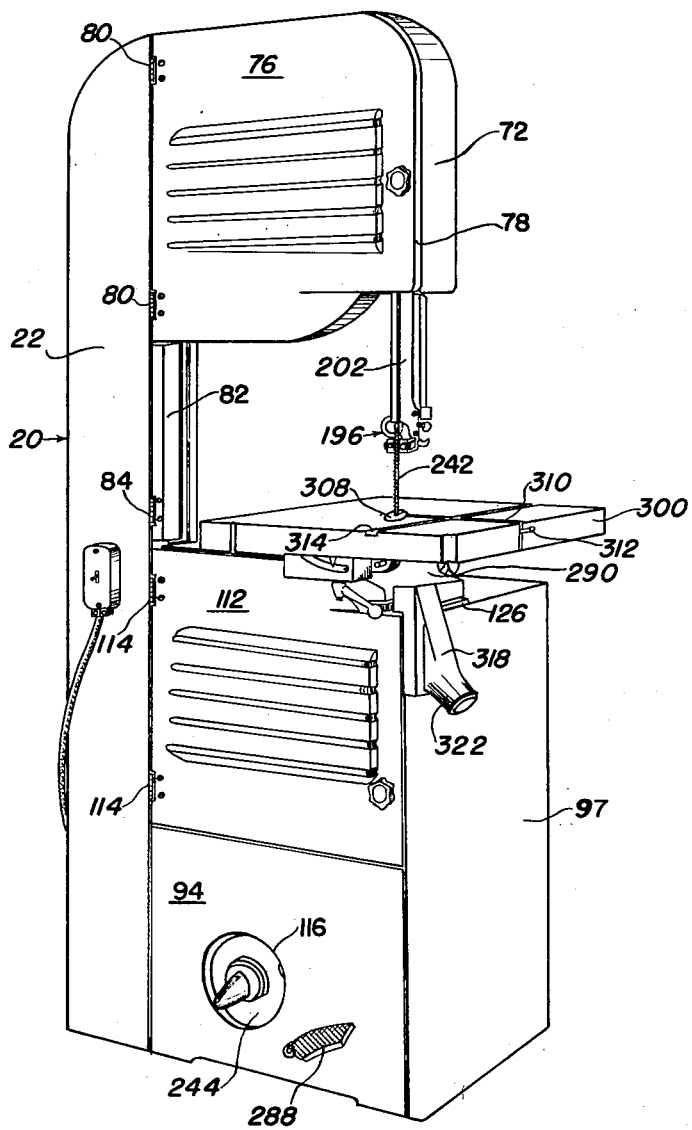
Figure 1 is a perspective view illustrating a band saw machine embodying the present invention, and showing one desirable design of the cabinet structure.
Figure 2:
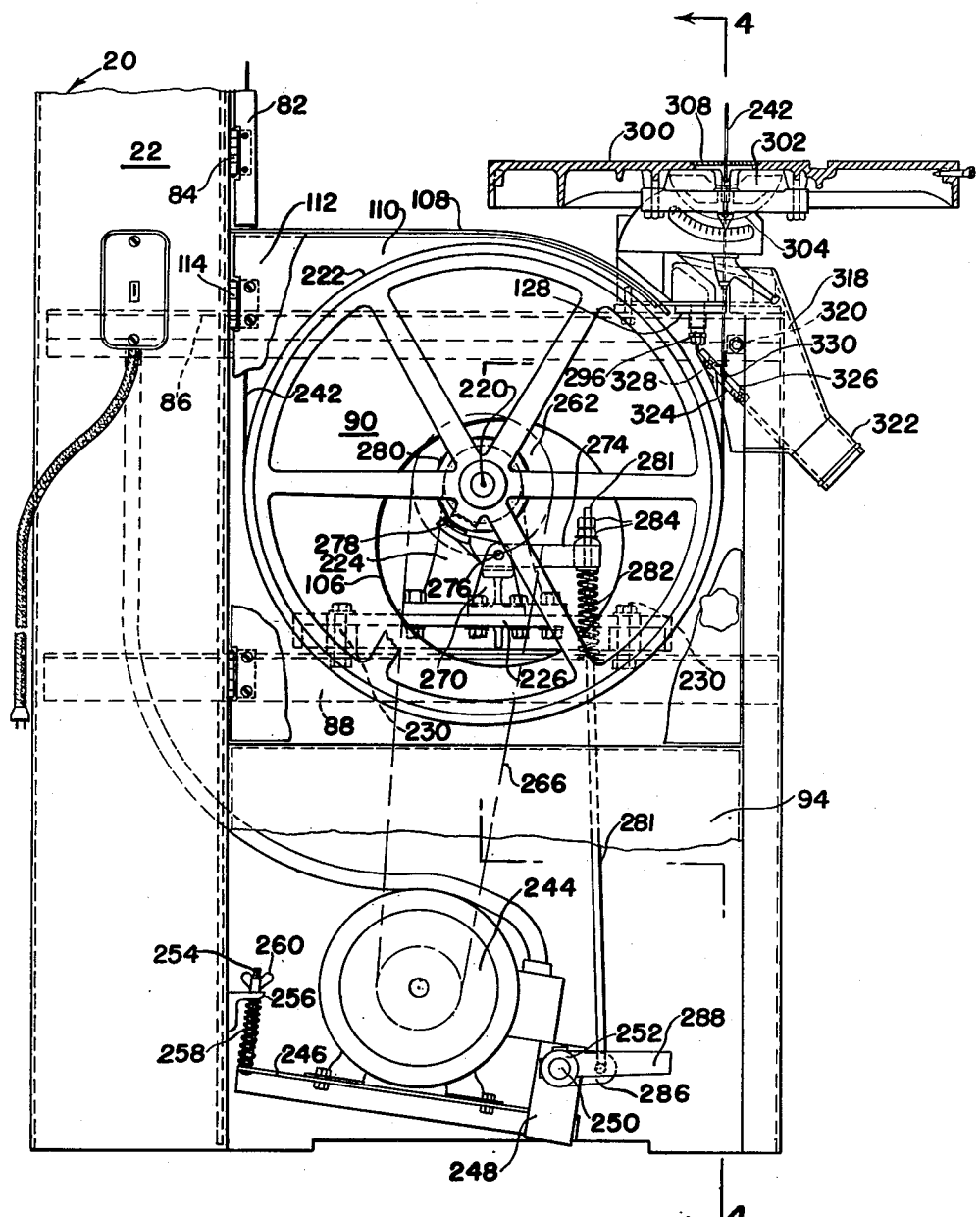
Figure 2 is a front elevation, the table being shown in section and the cabinet walls broken away to illustrate the drive means for the saw blade.
Figure 4:
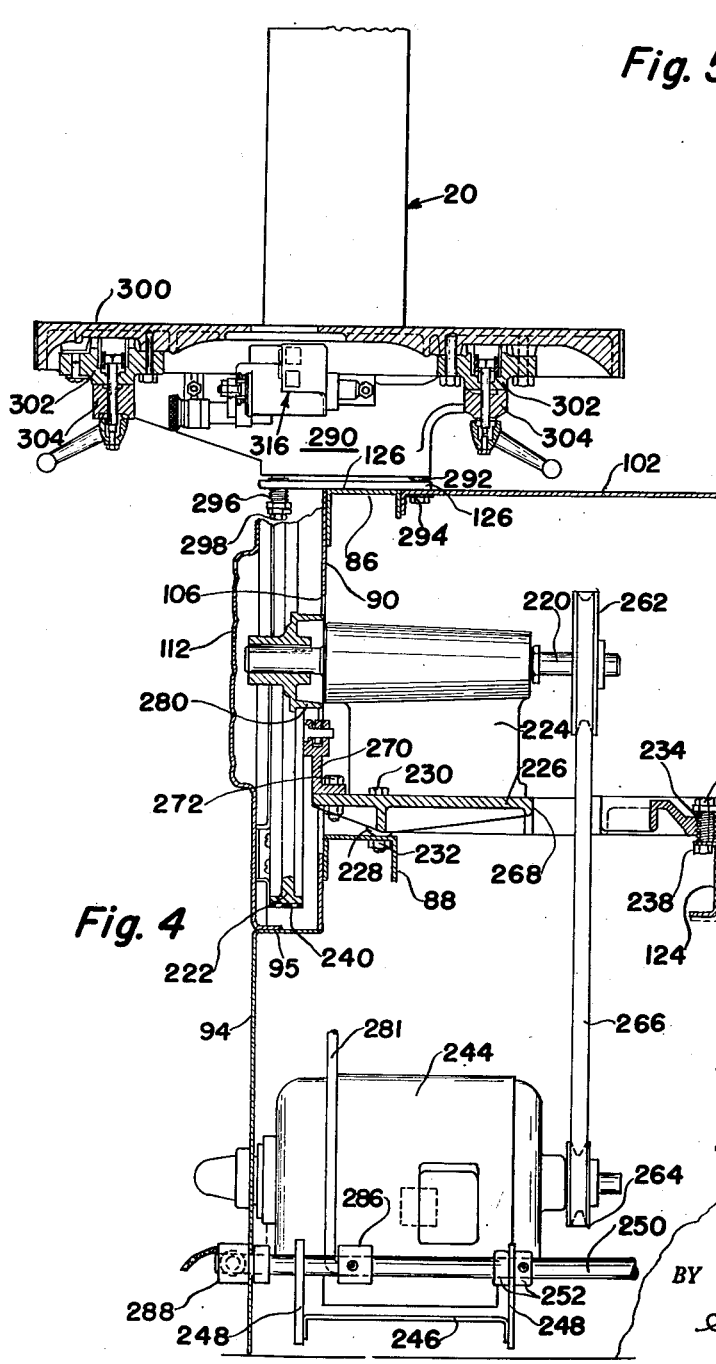
Figure 4 is a vertical transverse section through the work table and the lower cabinet compartment assembly taken substantially on the line 4—4 of Figure 2.

As shown in Figures 2 and 4 of the drawings, the shaft 220 of the lower wheel 222 is journalled in suitable grease packed bearings mounted in the upper end of the shaft support 224 which is rigidly bolted at its lower end upon a mounting plate 226 having a three point adjustable support upon the channel bars 88 and 124 in the lower compartment assembly. Thus, this plate at its front end is rockably supported at spaced points as shown at 228 in Figure 4, upon the upper surface of the channel member 88 and is connected therewith by the vertical bolts 230 having clamping nuts 232 threaded upon their lower ends. At its rear end, the mounting plate 226 is supported for vertical adjustment relative to channel member 124 by means of the externally threaded sleeve 234 vertically adjustable in a threaded opening in the mounting plate having bearing engagement at its lower end on the upper flange of channel member 124. A bolt 236 extending through said sleeve and a nut 238 threaded on its lower end to engage the flange of member 124 retains the sleeve in its adjusted position. It will therefore be clear that by loosening the bolt 236 and the nuts 232 and turning the sleeve 234, the mounting plate 226 may be vertically rocked to dispose the wheel 222 in a predetermined plane of rotation and in exact vertical alignment with the plane of rotation of the upper wheel 164. Preferably, the wheels are provided with peripheral tires of sheet rubber or equivalent material as shown at 240 with which the endless flexible steel saw blade 242 has non-slipping contact.

The lower wheel 222 is driven by an electric motor 244 of suitable horse-power rigidly mounted upon a supporting plate 246 in the lower compartment of the cabinet structure. This plate at one of its ends and its opposite side edges is provided with upwardly extending arms 248 which are rockably mounted upon a shaft 250 journalled at its ends in suitable bearings on the front and rear walls of the cabinet compartment. Axial shifting movement of the motor supporting plate relative to shaft 250 is prevented by the collars 252 rigidly fixed to said shaft at opposite sides of one of the arms 248.

The mounting or supporting plate 246 for the motor extends upwardly at a slight inclination from the shaft 250 toward the column 20 and at the latter end thereof is adjustably supported by means of a rod 254 extending upwardly from its lower end through a slot in the plate 246 and through an aperture in a bracket 256 welded or otherwise rigidly secured to the wall 98. A coiled spring 258 surrounds said rod between the bracket 256 and plate 246. A wing nut 260 is adjustably threaded upon the upper end of said rod and by adjusting this nut, the tension of spring 258 may be properly regulated.

To the rear end of the lower wheel shaft 220, a drive pulley 262 is suitably fixed, and a similar relatively small diameter pulley 264 is also fixed to the rear end of the shaft of motor 244. These pulleys are connected by one or more drive belts 266. When the belt is sprung over the respective pulleys the spring 258 will be compressed. The weight of the motor is sufficient to maintain a proper tension of the drive belt while the spring 258 takes up starting torque. When the machine is not being used, the tension of the drive belt may be relaxed by adjustment of the wing nut 260, and thus prolong the useful life thereof. The provision of the pivotally mounted motor supporting plate allows for varying belt lengths and pulley diameters. The drive belt extends between the upper and lower drive pulleys through a suitable opening in the mounting plate 226 for the lower band saw wheel 222, as indicated at 268 in Figure 4 of the drawings.

Upon the mounting plate 226 at the front end thereof a bracket member 270 is rigidly fixed by bolts 272 and in the upper end of this bracket member, a brake applying lever 274 is pivotally mounted intermediate of its ends as at 276. One end of this lever is upwardly curved and provided with suitable brake lining material 278 for frictional engagement with the periphery of hub 280 of wheel 222.

The other end of lever 274 is angularly offset inwardly and positioned above the channel member 88 in substantial alignment with an opening provided in the horizontal web of said channel member through which the rod 281 extends upwardly and through an opening in said end of the lever with which the rod is pivotally connected. A coil spring 282 is interposed between the end of the lever 274 and the channel member 88 and held in compression by means of the adjustable nuts 284 threaded upon the upper end of the rod 281. This rod extends downwardly into the motor compartment and at its lower end has an angular terminal portion pivotally connected with an arm 286 which is rigidly fixed to the shaft 250. To the forward end of said shaft, externally of the cabinet structure, a suitable foot pedal 288 is rigidly attached. Thus it will be understood that when the control switch is operated to stop the motor drive for the band saw, by downward pressure on foot pedal 288 lever 274 is actuated against the resistance of spring 282 to frictionally engage the brake material 278 with the wheel hub and quickly bring movement of the saw blade to a complete stop.

The supporting bracket 290 for the work table has a three point mounting on the plate 126. Thus, this bracket is held in rockable bearing contact, as indicated at 292, with the upper surface of plate 126 by screws 294 extending upwardly through the openings 132 in plate 126 and threaded into the bracket 290. An adjustable sleeve 296 is threaded in the other opening 130 of plate 126 and at its upper end has bearing contact with bracket 290. The bolt or screw 298 extending through this sleeve is threaded at its upper end into the bracket and holds said bracket and sleeve in adjusted position relative to the plate 126. Thus, by loosening the screws 294 and 298 and turning the sleeve 296, this bracket may be vertically adjusted to dispose the upper surface of the table supported thereby in a transverse horizontal plane exactly at right angles to the line of movement of the saw blade through the table.

To the under side of the work table 300 trunnion members 302 are rigidly secured at widely spaced points and are rockably mounted upon arcuately concave seats 304 formed on opposite ends of the bracket 290. Means is associated with each of said trunnion members for rigidly securing the table in adjusted position relative to the bracket. Thus, the table may be readily adjusted with its upper work supporting surface tilted in an inclined plane either in the forward or rearward direction.

As shown in Figure 9 the table 300 is provided with a vertical opening 306 and a slotted cap plate 308 closing the upper end thereof through which the saw blade passes. A saw blade entrance slot 310 to the opening 306 opens at its outer end through the right hand edge of the table, in which a tapered plug 312 is adapted to be inserted to prevent springing of the separated parts of the table. The upper surface of the table is also provided with a rectangular groove 314 extending at right angles to the slot 310 and in which a miter gauge or fence guide rail for the work is adapted to be inserted. However, this table construction and the trunnion mounting means for the table upon bracket 290 are not specifically claimed herein, as it is in all essential features fully disclosed and claimed in the Tautz Patent 2,040,718 of May 12, 1936.

A lower saw blade guide assembly (Figure 4) is mounted beneath the work table 300 upon the bracket 290. It will therefore be understood that the three point adjustable mounting of bracket 290 upon the plate 126 provides for the unitary adjustment of said bracket, the table 300 and the blade guide assembly about a horizontal axis substantially at right angles to the axis of the table trunnions 302 which lies substantially in the plane of the upper surface of the work table. Further detail description of the blade guide assembly is not required for the purposes of the present explanation as this assembly is fully disclosed and claimed in the Tauzt Patents 2,108,086, February 15, 1938, and 2,193,946, March 19, 1940.

As will be noted from reference to Figures 2 and 11 of the drawings, the inwardly turned edge portion 96 of the side wall of the lower compartment assembly terminates at its upper end some distance below the mounting plate 126. In this space and extending above the plate 126 dust spout 318 is rigidly secured to the cabinet wall 90 and the outer side flange of the channel member 86 by means of bolt 320. To the downwardly inclined outer end 322 of this dust spout a length of flexible tubing from a suitable source of suction is adapted to be connected. The inclined bottom wall of the spout 318 is provided at its upper end with an opening 324 above which a plate 326 is secured to this spout wall by the screws 328 and is provided with a guide slot 330 for the saw blade. The plate 326 picks up the majority of the saw dust clinging to or falling from the blade and directs it outwardly through the spout 318. The windage caused by the lower band saw wheel during rotation is directed by plate 126 across the blade so that the saw dust will actually be carried in suspension through the outer end 322 of the dust spout. Without this arrangement the saw dust would be carried by the blade and windage of the wheel into the lower compartment where it would collect in large quantities. Some of this dust would cling to the blade and be carried thereby around the upper wheel and downwardly onto the table where it would obscure any work guide line and would also collect on the wheel tire so that the blade would tend to slip.

In preparing the machine for operation the saw blade is first entered through the table slot 310 into the opening 306 thereof with approximately equal upper and lower loops which are loosely engaged over the peripheries of the upper and lower wheels 164 and 222 respectively and with the teeth of the right hand portion of the blade pointing downwardly toward the operator's position at the front of the machine. Screw 168 is then rotated to raise the upper pulley 164 and place the saw blade under a slight tension. The cap plate 308 is then applied over opening 306 with the open end of the slot in said plate facing rearwardly. Pin 312 is then tapped into the tapered opening at the right hand end of slot 310, care being taken to avoid excessive pressure. This pin will maintain the upper surface of the table at opposite sides of the slot 310 in a common plane.

The motor 244 is now inserted through the rear door opening of the cabinet and mounted upon the plate 246 as above described. After adjusting the motor pulley 264 into accurate vertical alignment with the pulley 262 on the end of the lower saw blade pulley shaft 220, the belt or belts 266 are then sprung over the pulleys 264 and 262 and held in proper tension by the weight of the motor 244.

For accurate and efficient cutting, proper blade tension is essential. Scale 180 is graduated to indicate proper tension for blades of different widths. Having centered the blade approximately on the upper and lower band saw wheels, the tension adjusting screw 168 is then operated to move the upper wheel upwardly until the pointer 178 registers with the graduation on scale 180 corresponding to the particular blade width. This screw first raises the sliding carriage 150 to take up slack in the blade and when the latter has snug frictional contact on the band saw wheels, additional rotation of the screw 168 compresses the coil spring 174 to develop the required tension. This spring also absorbs shock loads to which the blade may be subjected while cutting. In the event the blade is somewhat thicker than standard, the tension should be slightly higher than that indicated by the scale mark. When the machine is not in use, screw 168 should be operated to release the tension, and thereby release the tensional strain in the blade.

It is also necessary for accurate cutting and maximum blade life that the blade shall properly track upon the band saw wheels so that it will run steadily in the same vertical line. If the blade weaves across the crowns of the pulley wheels the cutting will not be uniform and liability of blade breakage will be increased.

Having first brought the blade to the correct tension as above explained, if it is found that the blade tends to creep forwardly, the knob 194 is turned slightly to tilt the upper wheel 164 toward the rear, thus centering the blade. If the blade tends to creep rearwardly knob 194 is rotated in the opposite direction, thus tilting the wheel forwardly. After checking by spinning the wheel by hand, so that it is certain that the blade will not run off of the peripheries of the wheels, the motor is then started and such final minor adjustments made as may be necessary at operating speed.

Each of the blade guide assemblies 196 and 316 includes a roller having supporting contact with the back edge of the blade. This roller and the other guiding elements should be adjusted as explained in the Tautz patent above referred to and backed off out of contact with the blade in making the tracking adjustment. This adjustment should never be attempted while the machine is in operation since at such high speed the blade may run off of the wheels, resulting in possible breakage thereof and injury to the operator. Knob 194, in each adjustment thereof, should be turned only a small fraction, as a very slight tilt of the upper wheel is required to draw the blade across the periphery thereof. As each blade has its own tendencies, especially after welding or brazing, this centering adjustment must be repeated whenever a new or repaired blade is installed, regardless of previous adjustments.

When the machine is assembled at the factory, the upper and lower band saw wheels are accurately adjusted in vertical alignment with each other to rotate in the same plane. Therefore, a normal saw blade should be readily centered on the wheels, proceeding in the manner just described. However, it is possible that this original adjustment of the band saw wheels may be disturbed during shipment, if the cabinet frame of the machine is abnormally stressed, or when new parts are installed. By reason of the three point mounting of the upper wheel supporting frame 134 and the lower wheel mounting plate 226, compensation may be readily made for such frame distortion. Thus, as previously described, by releasing the screw 142 and turning the sleeve 144, the mounting frame 134 may be readily adjusted to shift the upper wheel shaft through a small horizontal angle. Similarly by loosening screw 236 and rotating the sleeve 234, the lower wheel shaft may be shifted through a small vertical angle. After thus adjusting both wheels so that they accurately rotate in a common vertical plane, the screws 142 and 236 are then tightened to securely hold the wheels against relative displacement from their adjusted positions.

The work table 300 may be readily adjusted on the seats 304 to dispose its top surface in a forwardly or rearwardly inclined plane as fully described in the above-mentioned Tautz patent and securely locked to the supporting bracket 290 in such adjusted position. The table adjustment should be carefully checked to correct any disturbances that may have occurred during shipment. By the three point mounting for the supporting bracket 290, said bracket and the table may be vertically adjusted by means of the sleeve 296 through a small angle parallel to the trunnions. This adjustment should be checked by placing a mechanic's square against the back edge of the blade to be sure that the plane of the table surface is at exactly 90° with respect to the blade.

The three point mounting of the guide bracket 204 also provides a compensating adjustment for the upper blade guide assembly 196. Thus by loosening the screw 210 and adjusting sleeve 208 as explained, the bracket 204 may be angularly adjusted relative to the wall 34 of the upper cabinet compartment to dispose the rod 200 carrying the guide assembly 196 exactly in parallel relation to the rear edge of the saw blade. Therefore, if when the guide assembly 196 is lowered toward the table, the blade guides and supporting element do not bear a correct relationship to the blade, the necessary correction may be easily and quickly made by such adjustment of the guide bracket 204.

Before operating the machine, all of the above described adjustments should be properly made and the band saw wheels turned by hand as a final check. The cabinet doors, which are provided with suitable latch devices, are closed before starting the motor. The upper blade guide assembly 196 should be positioned as closely as possible to the work so that only a very small portion of the toothed edge of the blade in the immediate vicinity of the work is exposed, thus affording maximum protection to the operator as well as the best support for the blade. The foot brake should be used promptly after shutting off the power to stop movement of the saw blade. This is a safety precaution to prevent possible injury to the operator or others who may not observe that the blade is running idle after the work has been completed. Such a brake is also useful if the work should become jammed, or the saw blade should break.

It will be apparent that, if desired, the lower wheel 222 may be secured to the end of the shaft of motor 244 and directly driven thereby and said motor secured upon the adjustable mounting plate 226.

From the foregoing description and the accompanying drawings, the construction and several advantages of our new band saw will be clearly understood. It will be seen that by means of the above described adjustments for the upper and lower pulley wheels, said wheels may be maintained in accurate vertical alignment and proper tracking of the saw blade upon the peripheries of said wheels assured. Such adjustment together with the three point adjustment of the table supporting bracket and of the upper blade guide assembly enables compensating adjustments for possible distortions of the cabinet frame structure to be easily and quickly made. Also by reason thereof, this frame structure may be fabricated from sheet metal of lighter gauge than would otherwise be necessary, thereby minimizing the weight of the machine and correspondingly reducing construction and transportation costs. It will also be appreciated that the reinforcing plate 38 constructed and secured to the vertical column 20 in the manner above described provides a very rigid support for the upper cabinet compartment structure which will effectively resist pressure forces tending to vertically displace said structure and the wheel mounted therein relative to the column 20. The invention therefore provides a rugged large capacity machine of this kind for use in furniture factories, cabinet shops and other woodwork plants which may be easily maintained, without requiring unusual manual skill or dexterity, in accurately operating condition. The new cabinet structure results in desirable economies in the fabrication and assembly of the several parts thereof, which makes possible large scale production at comparatively low cost.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a band saw; a cabinet structure comprising a vertical column and upper and lower wheel compartment assemblies extending laterally from one side of said column; upper and lower saw blade wheels adapted to carry a saw blade, each of said wheels being rotatably journalled in respective upper and lower bearing means in the upper and lower wheel compartment assemblies; a first frame mounted in said upper assembly for rocking movement about a first axis; a plate carried by said frame and providing a pivot axis for pivotally supporting said upper bearing means on said first frame for movement about a second axis normal to said first axis; a second plate mounted in the lower wheel compartment assembly for rocking movement about an axis parallel to said second axis; separate means for moving said second mentioned plate and said frame about their respective axes; and additional means for moving said upper bearing means about the pivot axis provided by said first mentioned plate to dispose the respective axes of rotation of said wheels and their respective planes of rotation in preselected angular relationship to each other thereby compensating for structural and assembly inaccuracies of said assemblies and assuring tracking of said blade.

2. In a band saw; a cabinet structure comprising a vertical column and upper and lower wheel compartment assemblies extending laterally from one side of said column; upper and lower saw blade wheels carrying a saw blade, each of said wheels being rotatably journalled in respective upper and lower bearing means in the upper and lower wheel compartment assemblies; a first frame; means for supporting said frame on a vertical wall of said upper wheel compartment assembly for rocking movement about a first axis; pivot means supported by said frame for pivotally supporting said upper bearing means on said frame for rocking movement about a second axis normal to said first axis; cooperating means on said frame and said vertical wall for rocking said frame about said first axis; means carried by said frame for rocking said bearing means about said second axis; a plate rigidly supporting said lower bearing means, means supporting said plate for rocking movement in said lower wheel compartment assembly about an axis parallel to said second axis; and cooperating means on said plate and said lower wheel compartment assembly for rocking said plate about its axis, all of said rocking means cooperating to dispose the axes of rotation of said wheels and their respective planes of rotation in preselected angular relationship to each other thereby compensating for structural and assembly inaccuracies of said assemblies and assuring tracking of said blade.

3. In a band saw having a fabricated, sectional support frame comprising a vertical column, upper and lower wheel support sections extending laterally from one side of said column, respective upper and lower saw blades shaft and wheel assemblies supported from said respective wheel support sections; wheel mounting and aligning mechanism comprising respective journals mounting said respective shaft and wheel assemblies for rotation around an axis fixed with respect to their respective journals; respective support plates tiltably mounted on said wheel support sections and adapted to support said respective journals for selective bodily tilting with respect to said respective support sections to adjust the respective axes of rotation of said shaft and wheel assemblies with respect to each other; and additional support means comprising a support frame rigidly mounted on one of said support plates and having spaced, axially aligned pivot pins pivotally engaging the journal of said one support plate at right angles to its axis and adapting said journal and its associated shaft and wheel assembly for selective pivotal movement with respect to said one support plate; and means carried by said one support plate and connected to said last named journal for pivoting said journal around said pivot pins to a selected position, said support plates and said additional support means cooperating to provide for relative adjustment of the respective axes of rotation of said shaft and wheel assemblies and the respective planes of rotation of said wheels in all directions thereby compensating for structural and assembly inaccuracies in said fabricated, sectional support frame and assuring tracking of said blade.

4. In a band saw, a cabinet structure comprising a vertical column and upper and lower wheel compartment assemblies extending laterally from one side of said column; upper and lower saw blade wheels adapted to carry a saw blade; journal means for rotatably mounting a wheel in each of said compartment assemblies; plate means for supporting each of said wheel journal means for selective bodily tilting in its respective compartment assembly in respective planes to adjust the inclination of the axes of rotation of said wheels with respect to each other; and additional support means for one of said plate means comprising a frame tiltably supported on a wall of its respective compartment assembly and adapted to selectively bodily tilt said one plate means and its associated wheel mounting journal means in a plane at right angles to its said respective plane to adjust the axis of rotation of said one wheel in said right angular plane, said plate support means and said additional support means cooperating to provide for relative adjustment of the respective axes of rotation of said wheels and their respective planes of rotation in preslected angular relationship to each other thereby compensating for structural and assembly inaccuracies of said assemblies and assuring tracking of said blade.

CHRISTY A. WIKEN.
ERIC A. REIBIG.

REFERENCES CITED

The following references are of record in the file of this patent:

UNITED STATES PATENTS

| Number | Name | Date |
|---|---|---|
| 286,919 | Friedli | Oct. 16, 1883 |
| 656,800 | Arnold | Aug. 28, 1900 |
| 1,152,696 | Berry | Sept. 7, 1915 |
| 1,392,990 | Vaughan | Oct. 11, 1921 |
| 1,427,661 | Walker | Aug. 29, 1922 |
| 1,499,124 | Reichmann | June 24, 1924 |
| 1,591,247 | Tannewitz | July 6, 1926 |
| 1,841,939 | DeKonimg et al. | Jan. 19, 1932 |
| 1,848,300 | Avilla | Mar. 8, 1932 |
| 1,927,203 | De Groot | Sept. 19, 1933 |
| 2,032,233 | Tautz | Feb. 25, 1936 |
| 2,040,718 | Tautz | May 12, 1936 |
| 2,090,195 | Grob | Aug. 17, 1937 |
| 2,108,086 | Tautz | Feb. 15, 1938 |
| 2,193,946 | Tautz | Mar. 19, 1940 |
| 2,235,972 | Zimmerman | Mar. 25, 1941 |
| 2,274,923 | Hedgpeth | Mar. 3, 1942 |
| 2,347,765 | Boice et al. | May 2, 1944 |
| 2,371,731 | Boice et al. | Mar. 20, 1945 |
| 2,456,088 | Scircle | Dec. 14, 1948 |

FOREIGN PATENTS

| Number | Country | Date |
|---|---|---|
| 139,842 | Germany | Apr. 2, 1903 |